United States Patent Office 3,737,291
Patented June 5, 1973

3,737,291
PROCESS FOR REFORMING HEAVY HYDROCARBONS
Pierre Lhonore, Douai, Jacques Quibel, Maisons-Laffitte, and Michel Senes, Saint-Nazaire, France, assignors to Societe Chimique de la Grande Paroisse, Azote et Produits Chimiques
No Drawing. Continuation-in-part of application Ser. No. 758,768, Sept. 10, 1968. This application July 23, 1971, Ser. No. 165,699
Claims priority, application France, Sept. 12, 1967, 120,743
Int. Cl. C01b 2/22
U.S. Cl. 48—214                     13 Claims

ABSTRACT OF THE DISCLOSURE

A process for the catalytic reforming with steam in a fluidized bed of heavy hydrocarbons with a boiling point higher than 220° C., carried out under an effective pressure of 2 to 150 bars, in which the reforming mixture is introduced to the catalyst in the form of catalytic particles, of a solid solution of nickel oxide and refractory oxides, with a grain size which is between 1 mm. and 60$\mu$, at a temperature between 300 and 700° C., the volumetric speed on the fluidized bed is between 5 and 0.1 litre/hour per litre of catalyst, the ratio between steam and carbon in moles being between 0.75 and 3.0 and without regeneration or reoxidation of the catalyst.

---

This is a continuation-in-part application of application Ser. No. 758,768, filed Sept. 10, 1968 now Pat. No. 3,644,100 issued Feb. 22, 1972.

The present invention relates to the catalytic reforming of heavy hydrocarbons, particularly hydrocarbons with a final boiling point higher than 220° C., such as domestic fuels, either desulphurized or not, crude hydrocarbons, non-desulphurized crude kerosene, paraffin distillates and petroleum residues. The resultant reformed gas may be used for the production of hydrogen, of gases for the synthesis of ammonia, of methanol, or of oxo syntheses, and for the production of town gas.

The conventional methods of gasifying hydrocarbons all make use of thermal operations which inevitably lead to the formation of carbon black. Hitherto, no process actually known in connection with these procedures has been free from this serious disadvantage, of which the effect on the installation investments is very considerable. In addition, the formation of carbon constitutes a loss of the initial hydrocarbon materials, which to the extent of carbon formation do not result in the ultimately desired gases; thus, a decrease in the transformation rate results, and it is normally necessary to provide at the outlet of the reaction plant a unit for removing such undesirable carbon. In addition, the cracking reactions do not achieve a complete transformation of the substances to be treated, and an oil remains which must be eliminated from the departing gas.

When carried out properly, the known procedures of catalytic reforming in a fixed bed at best permit the treatment of hydrocarbons having a boiling point up to only about 200–250° C., and containing an appreciable proportion of aromatic hydrocarbons. To be carried out advantageously, this treatment must be effected under well controlled conditions, such as a high vapor rate (ratio of the number of molecules of water per carbon atom), and a high heat transfer rate, a progressivity of the heat transmission, good catalytic activity particularly limited in its cracking power, and the use of carbon-formation inhibitors.

In addition, the catalytic reforming reaction in a fixed bed can be effected satisfactorily only with hydrocarbons containing more than 10 carbon atoms per molecule, on account of the decomposition of these compounds which are to be treated. However, this leads to the undesirable carbon black formation with resultant clogging of the reactor.

It has previously been proposed to manufacture hydrogen and carbon monoxide by converting heavy tars and petroleum residues in a fluidized bed; in this process the particles in motion are non-catalytic solids, although they may be catalysts of simple chemical composition, such as the metals nickel, cobalt, molybdenum, or the oxides and/or carbonates of the alkali and alkaline earth metals. However, these procedures do not avoid the formation of carbon black, and in addition, require that the starting materials be desulfurized before treatment. In addition, these treatments require, at the least, that the catalyst be regenerated either continuously or at frequent intervals; consequently, it is normally necessary in such operations that the catalyst be circulated outside the reactor to a reoxidation zone. Such functional requirements have so far not permitted the process to be carried out industrially in an economic manner.

In accordance with the present invention, a steam reforming process for heavy hydrocarbons in a fluidized bed has now been provided, this process leading directly to reformed gas being obtained without the formation of carbon black. The process according to the present invention also permits the utilization of heavy hydrocarbons not previously desulfurized as the starting materials, while permitting a gasification of at least 80% of the starting material. This new catalytic reforming process in a fluidized bed may be used with any heavy hydrocarbon starting material, particularly fuels, heavy hydrocarbons, kerosene, paraffin and petroleum residues. Since any heavy hydrocarbon may be used, it is not necessary that such hydrocarbon be previously desulfurized, and this constitutes a significant advantage of the present invention.

The process is characterized in that it is carried out under pressure in the general range of from 2–150 bars, and without the regeneration or reoxidation of the catalyst. Preferably, the pressure is fixed between 30 and 150 bars. Use of the preferred elevated pressures to obtain the reformed gas has the advantage of providing an important saving in energy requirements.

When reformed gases are intended for the synthesis of ammonia, it is advantageous to carry out the fluidized bed reforming under a pressure of 150 bars. When the reformed gas is intended for the preparation of town gas, the reforming reaction is preferably carried out under a pressure of between 50 and 80 bars. On the other hand, when hydrogen or the gases obtained are intended for the conventional uses connected with the petro-chemical industry, the reforming pressure in the fluidized bed may be advantageously as low as about 30 bars.

The elevated pressures utilized in the fluidized bed process of the present invention provide the key factor to obtaining the superior results outlined above. In turn, in order to utilize such excessively high pressures, it is necessary to use a satisfactory catalyst, such as that disclosed in Pat. 3,533,963. Thus, when carrying out catalytic reforming in a fluidized bed in accordance with the present invention, it is possible, with catalyst compositions in the form of particles having a grain size between 1 mm. and 60 microns, and having a good mechanical behavior insensitive to sulfur involved in an organic combination, acting to inhibit thermal cracking and the consequent formation of free carbon, thereby avoiding regeneration of the catalyst, to increase the pressure and to obtain the advantageous reforming from crude heavy hydrocarbons, with a quantity of vapor which is practically equal to the minimum theoretical quantity.

Since the decomposition of the hydrocarbons in the presence of steam is of the radical type, suitable catalysts must be sufficiently active and selective in a fluidized bed in order to lead to a reformed gas being obtained from the heavy hydrocarbons with the result that only a small part of the heavy hydrocarbons are not gasified, i.e. such heavy materials, such as paraffin residues, being reduced to minimum quantity during the steam reforming, and this in conjunction with the use of non-prohibitive steam ratios (steam/carbon in moles) being between 0.75 and 3.0. In practice, but without danger of hydrocarbon coking (i.e. the production of carbon black) the steam ratio can be lowered to a value corresponding to the absence of steam in the reformed gas.

In general, the particles of the catalyst compositions suitable for carrying out the invention contain nickel on a support of refractory oxides. The active metal is nickel, of which the content, calculated as nickel oxide, is between 1 and 40% by weight. The refractory oxides, kept in constant ratios, are silicon dioxide, magnesium oxide and zirconium dioxide. These compositions, applicable to the reforming under pressure in a fluidized bed, are characterized in that the magnesium oxide and the zirconium dioxide are in a ratio by weight of magnesium oxide/zirconium dioxide between 1.7 and 2, and preferably close to 1.85, and the magnesium oxide and the silicon dioxide are in a ratio by weight of magnesium oxide/silicon dioxide which is between 4.5 and 5, preferably 4.7. These compositions can optionally contain an activator in the form of alkali or alkaline earth metal compounds, of which the relative proportions are preferably between 0.3 and 3.

In other catalyst compositions which can be used in the process of the present invention, the nickel as active metal, of which the nickel content calculated as nickel oxide is between 5 and 20%, is combined with a refractory support, which is formed particularly by oxides such as magnesium oxide, aluminum oxide, calcium oxide and zirconium dioxide, and in which the magnesium oxide present in an amount between 50 and 60% represents the major proportion of such oxides, the aluminum oxide content being reduced to at most 20% by weight. These catalyst compositions may also optionally contain stabilizing materials, such as chromium, potassium, barium, sodium, iron and titanium oxide.

Other catalyst compositions containing nickel as the active metal, suitable for the present invention, have a nickel content, calculated as nickel oxide, between 8 and 50% by weight, and a refractory oxide support of magnesium oxide in an amount between 0 and 45%, aluminum oxide in an amount between 0 and 60%, calcium oxide in an amount less than 25% and silicon dioxide in an amount below 10%. These catalyst compositions may also contain stabilizers in an amount of 1–5%.

A few non-limiting formulae of these catalyst compositions are given hereinafter by way of example, it being understood that suitable catalyst compositions for use in the present invention are described in detail in the Senes et al. Pat. 3,533,963. The different elements of these catalyst compositions are present as a diffused solid solution, and the catalysts are so obtained by sintering at high temperatures of 1300–1400° C.

In more detail, suitable catalysts may be obtained by placing the different constituents, as indicated above, simultaneously together in a mixture and submitting the mixture to sintering at 1300–1400° C. The elevated temperature permits the formation of a multi-phase eutectic causing contraction of the solid, thereby providing a surface which does not favor the formation of carbon, as well as an internal structure of high strength. These catalysts function up to 25,000 hours without any degradation of physical or chemical properties. The bonds formed by sintering assure a very great cohesion of the structure of the grains of the catalyst.

In the preparation of the catalyst, the nickel oxide is mixed with the suitable refractory oxides, such as those indicated above such as magnesium oxide, zirconium dioxide, silicon dioxide, titanium dioxide, aluminum oxide and/or calcium oxide, and are then mixed with water to obtain a homogeneous paste. The stabilizers, if used, such as potassium hydroxide, sodium hydroxide, barium hydroxide or chromium trioxide may be mixed therewith, or preliminarily dissolved in the water. The homogeneous oxide paste is dried at 70° C. and results in hydraulic setting. This material is next ground to the desired granulometry of between about 1.2 mm. and 65 microns. The grains are then baked at a temperature between 1300 and 1400° C. preferably 1350° C.

This high temperature baking or sintering produces a contraction in the grain size of the catalyst so that the grains, after such high temperature baking, have a size between 1 mm. and 60 microns. This method supplies the very important peculiarity of eliminating the ridges and roughness on the grains caused at the time of granulation. Furthermore, the fact that the grains are not compressed before heating, coupled with the sintering forces which are developed during the course of heating, results in the tendency to render the grains more or less spherical in configuration. This spherical configuration tends to prevent the grains from sticking to one another.

In the use of such catalytic grains in a fluidized bed in accordance with the process of the present invention, it has been found that the volumetric speed of the hydrocarbon vaporized through the fluidized bed should be chosen to lie between 5 and 0.1 liters of vaporized hydrocarbon per hour per liter of catalyst. The reforming reaction can optionally be carried out on several fluidized beds in series. It has been observed that it is advantageous to select the ratio between the height of the catalyst bed and the diameter to be between 0.6 and 7.

The catalyst bed is fluidized, i.e. brought into suspension, by the reagents of the reforming reaction which are blown through a suitable screen or the like at the bottom of the reactor. It is optionally possible to use with the reforming reagents a neutral carrier gas, such as nitrogen. It is sometimes advantageous to recycle the reformed gas or hydrogen, separated from its condenser residues, to the inlet of the reforming zone in place of nitrogen.

In order to carry out the process of the present invention advantageously, the reforming mixture should be introduced into the fluidized catalyst bed at a temperature which is between 300 and 700° C., preferably between 400 and 600° C. In the meantime, the temperature of the fluidized bed itself is preferably between 700 and 900° C.

The process of the present invention, in which the reforming reaction is carried out in the absence of free carbon formation, offers the advantage of great simplication in procedure; in particular, units for purifying hydrocarbons prior to treatment, and for regenerating the catalysts, are omitted. The absence of free carbon constitutes another advantageous result in that hydrocarbon losses, due to the formation of such carbon, as well as catalyst losses caused by regeneration and the circulation of the catalyst outside the reforming zone, are avoided. The absence of circulation of catalyst particles permits the process to be carried out industrially, without particular difficulty, operating under the desired high pressure.

Examples are given below which illustrate the present invention in a non-limiting manner.

EXAMPLE 1

A domestic fuel of the empirical formula $C_{15.6}H_{33.2}$, containing several thousand parts per million of sulphur, is treated in a reaction tube with an internal diameter of 80 mm. and a height of 800 mm. containing 1250 ml. of catalyst with the grain size $120\mu$.

The catalyst composition is of the type comprising nickel (as NiO), 6 to 10%, preferably about 8% magnesium oxide (MgO), 50 to 53%, preferably 52% zirconium dioxide ($ZrO_2$), 24 to 34%, preferably 28%, silicon dioxide ($SiO_2$), 9 to 12%, preferably 11%.

A series of tests is carried out at atmospheric pressure.

The values of the rates of flow (of hydrocarbon, steam and hydrogen), of the vapour ratios, the preheating temperatures of the mixture to be treated and of the catalyst bed, as well as the compositions of the departing gas are set out in the following Table I.

TABLE I

| Rates of flow | | | Content of sulphur (p.p.m.) | $H_2O/C$ (moles per atom) | Preheating temperature of mixture | Temperature of catalyst bed | Composition of the reformed gas | | | | |
|---|---|---|---|---|---|---|---|---|---|---|---|
| Fuel (ml./h.) | Steam (l./h.) | $H_2Na$ (l./h.) | | | | | $CO_2$ | CO | $H_2$ | $CH_4$ | $C_2$ |
| 11.3 | 128 | 16.2 | 2,900 | 8.4 | 490 | 840 | 13.8 | 6.4 | 76.6 | 2.1 | 0 |
| 18.8 | 130 | 11.5 | 2,900 | 5.2 | 490 | 840 | 14 | 9.6 | 72.5 | 5.2 | 0 |
| 22.2 | 113 | 12.8 | 2,900 | 3.85 | 490 | 840 | 12.8 | 11.2 | 71.3 | 3.9 | 0 |
| 23.7 | 98.3 | 13.5 | 2,900 | 3.15 | 490 | 840 | 11.4 | 13.1 | 70.5 | 4.3 | 0 |
| 20.8 | 100 | 9.7 | 3,350 | 3.7 | 490 | 840 | 12.9 | 11.9 | 70.3 | 4.2 | 0 |
| 21.8 | 79 | 10 | 3,350 | 2.8 | 490 | 840 | 11.4 | 13.8 | 69.3 | 4.7 | 0 |
| 23.4 | 51.3 | 15.7 | 3,350 | 1.7 | 490 | 840 | 8.3 | 19.1 | 66.9 | 4.9 | 0 |
| 19.9 | 26.6 | 16 | 3,350 | 1 | 490 | 840 | 3 | 23.2 | 68.8 | 4.1 | 0 |

In the first cycle of tests, a partially desulphurised domestic fuel (content 2900 p.p.m. by weight) is treated and hydrogen is added to the reactants in order to permit a desulphurisation on a palladium and zinc oxide catalyst. The quantity of zinc oxide is saturated in a very short time and thereafter the hydrogen is no longer necessary.

In the second cycle of tests on non-desulphurised domestic fuel (3350 p.p.m. by weight), the desulphurising catalysts have been removed, since in the first series of tests the presence of the sulphur did not deteriorate the qualities of the reforming. However, the hydrogen was kept as gaseous carrier of the fuel for assisting its vaporisation.

EXAMPLE 2

In a reactor identical with that of Example 1, containing 1270 ml. of catalyst of the preceding type, with the grain size of $120\mu$ a series of reforming tests is carried out under atmospheric pressure on a paraffin distillate of the empirical formula $C_{20}H_{42}$.

In order not to falsify the results of the tests on the paraffin residues, set out in the following Table II, the hydrogen is replaced by nitrogen as gaseous carrier of the liquid in order to assist its vaporisation, and so that no ambiguity is introduced into the analysis of the reformed gas.

TABLE II

| Rates of flow | | | Sulphur content (percent) | $H_2O/C$ (moles per carbon atom) | Preheating temperature of mixture | Temperature of catalyst bed | Composition of reformed gas | | | | | |
|---|---|---|---|---|---|---|---|---|---|---|---|---|
| Paraffin distillate (ml./h.) | Steam (l./h.) | $H_2$ | | | | | $CO_2$ | CO | $H_2$ | $CH_4$ | $C_2$ | $N_2$ |
| 10 | 154.8 | (1) | 2.4 | 10.8 | 490 | 850 | 17.3 | 2 | 55 | 6.8 | 3.9 | 14.8 |
| 17 | 149.5 | (1) | 2.4 | 6.1 | 490 | 850 | 15 | 2.8 | 58.7 | 7.7 | 5.3 | 19 |
| 28.8 | 145 | (1) | 2.4 | 3.4 | 490 | 850 | 20.6 | 5.6 | 53.5 | 10.4 | 6.1 | 0 |
| 37.5 | 145 | (1) | 2.4 | 2.7 | 490 | 850 | 17.6 | 6.1 | 54.6 | 10.6 | 5.6 | 5.4 |
| 37.2 | 134.5 | (1) | 2.4 | 2.5 | 490 | 850 | 14.9 | 6.9 | 56.2 | 12.1 | 6.7 | 3.5 |
| 43.2 | 108 | (1) | 2.4 | 1.75 | 490 | 850 | 14.3 | 8.4 | 52.6 | 13.8 | 8.1 | 2.2 |

[1] Not determined.

The laboratory tests at atmospheric pressure have permitted the following facts to be shown:

(a) the possibility of reforming with steam mixtures of heavy hydrocarbons such as the paraffin distillates or fuels, without liberation of carbon;

(b) the possibility of carrying out this reaction on catalyst compositions specifically chosen for this purpose and maintained in a fluidised bed;

(c) as it is very difficult to free the heavy products from their sulphur, a first progress consists in improving the catalyst compositions being investigated in order that they are able to treat, without degradation, products containing several percent of organic sulphur.

EXAMPLE 3

In a reactor identical with that of Example 1, a series of reforming tests is carried out on a paraffin distillate of empirical formula $C_{20}H_{42}$, in a fluidised bed under atmospheric pressure, the reforming being effected on a lesser quantity of catalyst, with the purpose of studying the incidence of the steam proportion ($H_2O/C$) and that of the spatial speed on the qualities of the reformed gas and on the fixed residue.

The reactor contains 1010 ml. of catalyst of the type employed in the other examples, and with a grain size which is between 100 and $630\mu$.

The results obtained are set out in the following Table III.

TABLE III

| Rates of flow | | | Content of free sulphur in percent | $H_2O$ in moles per atom of C | Percent gasified | Residue, percent weight | Temperature | | Composition of the reformed gas | | | | | | |
|---|---|---|---|---|---|---|---|---|---|---|---|---|---|---|---|
| Paraffin distillate in l./h. | Steam of l./h. | $H_2$, l./h | | | | | Preheating | Catalyst bed | $CO_2$ | CO | $H_2$ | $CH_4$ | $C_2H_4$ | $C_2H_6$ | N |
| 94 | 260 | 13 | 2.4 | 1.9 | 88.2 | 0 | 549 | 832 | 15.3 | 8.8 | 50.5 | 9.8 | 9.0 | 0.8 | 5.8 |
| 121 | 254 | 13.3 | 2.4 | 1.39 | 78.2 | 0 | 549 | 832 | 13.9 | 8.9 | 49.9 | 11.0 | 10.0 | 1.1 | 5.2 |
| 121 | 232 | 14.1 | 2.4 | 1.26 | 69.5 | 0 | 564 | 832 | 15.0 | 8.2 | 48.7 | 10.4 | 10.5 | 0.9 | 6.3 |
| 142.3 | 260 | 13.8 | 2.4 | 1.26 | 60.6 | 0 | 564 | 832 | 14.0 | 7.3 | 48.5 | 12.0 | 10.9 | 1.0 | 5.4 |
| 142.3 | 202 | 12.2 | 2.4 | 0.975 | 79.5 | 0 | 554 | 836 | 10.7 | 9.1 | 44.9 | 15.3 | 13.2 | 1.4 | 5.2 |
| 149 | 162 | 10.2 | 2.4 | 0.744 | 67.5 | 20.0 | 574 | 860 | 4.9 | 8.1 | 34.2 | 26.6 | 19.3 | 1.8 | 5.1 |
| 151 | 94 | 12.5 | 2.4 | 0.884 | 75.4 | 22.6 | 564 | 860 | 9.0 | 9.5 | 44.3 | 16.9 | 13.9 | 1.4 | 5.0 |
| 151 | 184.2 | 13.0 | 2.4 | 0.837 | 74.5 | 19.0 | 554 | 836 | 11.1 | 10.0 | 43.8 | 15.9 | 12.6 | 1.4 | 6.2 |
| 151.5 | 170.7 | 13.8 | 2.4 | 0.776 | 67.8 | 20.0 | 574 | 860 | 10.1 | 13.8 | 46.8 | 13.4 | 9.35 | 1.2 | 5.4 |
| 156.7 | 193 | 15.4 | 2.4 | 0.845 | 68.4 | 21.2 | 574 | 860 | 6.4 | 8.6 | 58.2 | 17.6 | 20.9 | 1.6 | 7.7 |
| 162 | 142 | 9.6 | 2.4 | 0.604 | 68.1 | 20.0 | 574 | 860 | 6.1 | 8.6 | 36.1 | 23.7 | 19.1 | 1.6 | 4.8 |
| 163 | 164.5 | 13.6 | 2.4 | 0.845 | 64.7 | 22.6 | 564 | 860 | 10.2 | 9.2 | 43.4 | 16.1 | 13.0 | 1.2 | 6.9 |
| 164.5 | 164.2 | 11.8 | 2.4 | 0.519 | 57.6 | 18.5 | 564 | 860 | 7.0 | 9.8 | 42.9 | 21.7 | 11.9 | 1.1 | 5.6 |
| 165.5 | 169.5 | 10.6 | 2.4 | 0.725 | 77.2 | 27.0 | 574 | 860 | 6.2 | 12.7 | 42.9 | 18.3 | 13.0 | 1.5 | 4.4 |

It is apparent from reading the above table that the importance of the non-gasified residue increases as a function of the decrease in the quantity of steam.

The study of the mineralisation of the sulphur during operation has enabled it to be shown that, starting with the same initial hydrocarbon, the quantity of non-mineralised sulphur at the outlet depends on the conversion ratio.

EXAMPLE 4

A pilot installation having a heating and vaporizing zone for reactant fluids, a super-heating zone for the mixture and a reactor containing the fluidized bed, is provided for operation at a pressure up to about 50 bars, and especially intended for the treatment of 4–5 liters per hour of paraffin distillate or other heavy product at 40 bars and the temperature of the catalyst at 700–900° C.

The paraffin distillate made liquid at 70° C. was introduced in liquid form under nitrogen pressure to the heating and vaporization zone simultaneously with a stream of nitrogen. Also passed into the vaporizer is liquid water. The feed materials, in vaporized form, are combined at a temperature in the region of 360° C. The vaporizer has three zones: in the first zone, the reactant mixtures are preheated to about 110° C.; in the second zone, they are vaporized between 110 and 250° C.; and in the third zone, they are subjected to super-heating up to 350–360° C. The super-heated mixture is then carried to the super-heater which itself has two zones, namely a second super-heating lower zone where the mixture is heated to about 400° C., and the third super-heating upper zone where the mixture is heated to 460° C. After passing through the super-heater, the mixture consisting of steam, hydrocarbon and nitrogen, super-heated from 360–460° C., enters the reforming reactor in contact with the fluidized bed of catalyst grains. The reactor contains at its bottom end, through which the gases pass, suitable fluidization grids; in addition, the reactor has two fluidization zones, the lower bed having a diameter of 80 mm. and ratio between height and diameter of 1.5. This lower bed contains 600 ml. of catalyst. The reactant gases at 460° C. penetrate into the lower bed, the temperature which is kept at 860° C. After passing through the first bed, the gases then penetrate through a second fluidization grid into the upper bed of the same diameter, having a height to diameter ratio of 0.8, the temperature of which is kept at 700° C., and which contains 320 ml. of catalysts.

Depending on the formula of the treated hydrocarbons, the volumetric speed on the combination of the two beds is 10 carbons/hour/litre of catalyst. The catalyst composition has a grain size from 100 to 630$\mu$.

The composition of the reformed gas leaving the top of the fluidized reactor is:

| | |
|---|---|
| $CO_2$ | 5 to 10 |
| CO | 8 to 14 |
| $H_2$ | 35 to 45 |
| $CH_4$ | 13 to 26 |
| $C_2H_6$ | 1.1 to 1.8 |
| $C_2H_4$ | 11 to 20 |
| $N_2$ | 5 to 7 | when a paraffin residue is treated under a pressure of 10 bars, said residue having the following characteristics:

Density 0.913, aniline point 73
Distillation:
    30% at 300° C.
    70% at 400° C.
Asphaltes 0.1%
Ashes 0.02%
Sulphur 2%

EXAMPLE 5

A further reaction was carried out in a reactor of an industrial installation, under high pressure.

Operations of relatively long duration were carried out under a pressure of 30 bars, treating an industrial fuel of formula $C_{15}H_{33}$. The spatial velocity of carbon per liter of catalyst is 52 and the vapor ratio of $H_2O/C$ counted as molecules of water per atom of carbon, is from 1.80 to 1.2. The reactant mixture is super-heated to 550° C. The reactor contains 2650 ml. of catalyst of the type indicated in the preceding examples and with the grain size from 60 to 430$\mu$, while the catalyst bed has a diameter of 150 mm. and a ratio between height and diameter of 2.0.

The mean composition of the reformed gas leaving the top of the reactor is as follows:

| | |
|---|---|
| $CO_2$ | 5.4 |
| CO | 20.5 |
| $H_2$ | 68.4 |
| $CH_4$ | 5.2 |
| $C_2H_6$ | 0.5 |
| $C_2H_4$ | 0 |

Under these conditions, the hydrocarbon is 100% reformed. The sulphur present in the fuel in the amount of 3000 p.p.m. by weight is completely mineralized to the state of $H_2S$.

When treating a paraffin distillate of the formula identical with that of Example 4, containing 2.4% of sulphur, under a pressure of 30 bars, in the same reactor and on the same fluidized catalyst bed, a reformed gas is obtained at the outlet, of which the mean composition is as follows:

| | |
|---|---|
| $CO_2$ | 7.0 |
| CO | 9.5 |
| $H_2$ | 32.9 |
| $CH_4$ | 21.2 |
| $C_2H_6$ | 1.8 |
| $C_2H_4$ | 19.7 |
| $N_2$ | 7.9 | when the reactant mixture was preheated to 550° C. and the fluidized bed was kept at 840° C., the spatial velocity of carbon per liter of catalyst being 20 and the vapor ratio of $H_2O/C$ being from 0.98 to 0.75.

Under these conditions, the paraffin distillate is 80% reformed. The non-gasified residue is 20%. About 50% of the sulfur present in the paraffin distillate is mineralized to the state of $H_2S$.

It will be understood that variations may be made without departing from the scope of the invention, and that the invention is intended to cover what is caimed as well as the equivalents thereof.

What is claimed is:

1. A process for the continuous catalytic reforming of a heavy hydrocarbon with a boiling point higher than 220° C. with steam in a fluidized bed, which comprises passing a preheated vaporous reforming mixture of said hydrocarbon, said steam and a carrier gas under an effective pressure of 30 to 150 bars through a reforming fluidized zone containing the catalyst in the form of catalytic particles with a grain size which is between 1 mm. and 60$\mu$ of a diffused solid solution sintered at a high temperature of nickel oxide and refractory oxides support, wherein the reforming mixture is introduced at a temperature between 300 and 700° C. with the catalyst bed having a temperature of 700–900° C., and without recycling and regeneration of the catalyst, wherein the volumetric speed through the fluidized bed is between 5 and 0.1 l./hour per litre of catalyst, wherein the ratio of moles of steam per atom of carbon is between 0.75 and 3.0.

2. A process according to claim 1, wherein said heavy hydrocarbon with a boiling point higher than 220° C. is a non-desulfurized crude hydrocarbon containing up to several percent of sulfur.

3. A process according to claim 1, wherein said carrier gas is nitrogen.

4. A process according to claim 1, wherein said carrier gas is recycled hydrogen.

5. A process according to claim 1, wherein the catalytic particles have a grain size which is between 630 and 60$\mu$.

6. A process for catalytic reforming with steam in a fluidized bed of heavy hydrocarbons according to claim 1, wherein the catalyst comprises a diffused solid solution obtained by sintering at high temperature of nickel oxide in an amount between 1 and 40% by weight, and a support formed by a mixture of refractory oxides of silicon dioxide, magnesium oxide, and zirconium dioxide, the ratio of magnesium oxide to zirconium dioxide being between 1.7 and 2, and the ratio of magnesium oxide to silicon dioxide being between 4.5 and 5.

7. A process for catalytic reforming with steam in a fluidized bed of heavy hydrocarbons according to claim 6, wherein the ratio by weight of magnesium oxide to zirconium oxide is about 1.85, and the ratio by weight of magnesium oxide to silicon dioxide is about 4.7.

8. A process for catalytic reforming with steam in a fluidized bed of heavy hydrocarbons according to claim 1 wherein the catalyst composition contains said nickel oxide in an amount between 5 and 20% and said refractory support comprises magnesium oxide, aluminum oxide, calcium oxide and zirconium dioxide, in which the magnesium oxide, of which the content is between 50 and 60, represents the largest proportion of these oxides, the aluminum oxide content being at most equal to 20% by weight.

9. A process for catalytic reforming with steam in a fluidized bed of heavy hydrocarbons according to claim 1 wherein the catalyst composition contains said nickel oxide in an amount between 8 and 30% by weight, and said support of refractory oxides is formed by magnesium oxide in a content between 0% and 45%, aluminum oxide in a content between 0 and 60%, calcium oxide in a content smaller than 25% and silicon dioxide in a content smaller than 10%.

10. A process for catalytic reforming with steam in a fluidized bed of heavy hydrocarbons according to claim 1, wherein fluidization is so controlled to provide a ratio between height and internal diameter of the reforming fluidized zone between 0.6 and 7.

11. A process in accordance with claim 2 for the preparation of town gas wherein said pressure is between 50 and 80 bars.

12. A process in accordance with claim 2 for the preparation of hydrogen wherein said pressure is about 30 bars.

13. A process in accordance with claim 2 wherein the catalytic particles have a grain size which is between 630 and 60 microns, wherein said temperature of introduction of the reforming mixture is between 400 and 600° C. and wherein fluidization is so controlled to provide a ratio between height and internal diameter of the reforming fluidized zone between 0.6 and 7.

References Cited
UNITED STATES PATENTS

| | | | |
|---|---|---|---|
| 2,967,145 | 1/1961 | Garihan et al. | 23—288 S X |
| 3,119,667 | 1/1964 | McMahon. | |
| 3,459,520 | 8/1969 | Percival | 48—214 |
| 3,476,536 | 11/1969 | McMahon et al. | 48—214 |
| 3,533,963 | 10/1970 | Senes et al. | 252—466 X |

JOSEPH SCOVRONEK, Primary Examiner

U.S. Cl. X.R.

252—373; 423—653, 654